UNITED STATES PATENT OFFICE.

THOMAS H. LA ROCHE, OF LOCKPORT, NEW YORK.

IMPROVEMENT IN LUBRICATING COMPOUNDS.

Specification forming part of Letters Patent No. 179,801, dated July 11, 1876; application filed June 27, 1876.

*To all whom it may concern:*

Be it known that I, THOMAS H. LA ROCHE, of Lockport, in the county of Niagara and State of New York, have invented certain new and useful Improvements in Lubricating Compounds; and I do hereby declare the following to be a full, clear, and exact description of the invention, such as will enable others skilled in the art to which it pertains to make and use it.

My invention consists of a compound for lubricating purposes for machinery, of such ingredients that it will remain fluid throughout a large range of temperature, and at the same time possess a sufficient degree of density or specific gravity to hold in complete suspension a sufficient quantity of pulverized graphite to enhance its value as a lubricator, as compared with simple oils, being an improvement upon my patent numbered 177,525, dated May 16, 1876, and of which I am now the sole owner.

First, take of kerosene oil or other mineral or lubricating oil, about eight fluid ounces; of bees-wax, japan-wax, myrtle-wax, or paraffine, about four ounces; and thoroughly dissolve the latter in the former by the aid of heat—say, about 160° Fahrenheit. To this add about eight ounces of the best quality of graphite, finely pulverized, and mix the whole thoroughly. To this add about eighty-eight fluid ounces of crude petroleum or other mineral or lubricating oil. Then reduce the temperature of the mixture to about 75° or 80° Fahrenheit, keeping it well stirred to prevent precipitation.

Second, in about thirty-two fluid ounces of pure water—in a separate vessel—thoroughly dissolve about four ounces of carbonate of potassa, carbonate of soda, or other alkaline carbonate, and gradually mix the two compounds together, continuing the stirring until all is thoroughly mixed and the temperature is reduced to about 40° Fahrenheit.

If the resulting compound thus prepared is not sufficiently fluid it can be rendered so by the addition of from six to eight fluid ounces of crude glycerine. The glycerine may be added by mixing it with the water in the second stage of the process, or be omitted entirely if rendered unnecessary by the fluidity of the oil used.

The proportion of any of the ingredients may be varied without essentially changing the nature of the compound.

What I claim as my invention, and desire to secure by Letters Patent, is—

The herein-described lubricating compound composed of kerosene-oil, crude petroleum, or other mineral or lubricating oil, bees-wax, japan-wax, myrtle-wax, or paraffine, water, carbonate of potassa, carbonate of soda, or other alkaline carbonate, and crude glycerine under the condition named, substantially as and for the purposes specified.

In testimony that I claim the foregoing I have hereunto set my hand this 23d day of June, 1876.

THOMAS H. LA ROCHE.

Witnesses:
JOHN T. SMITH,
J. R. COMPTON.